United States Patent [19]

Hall

[11] Patent Number: 5,427,836
[45] Date of Patent: Jun. 27, 1995

[54] SAFETY NET

[76] Inventor: Harry R. Hall, 1430 Burke Rd., Baltimore, Md. 21220

[21] Appl. No.: 110,073

[22] Filed: Aug. 20, 1993

[51] Int. Cl.[6] .......................... B32B 3/06; B32B 7/00; D03D 3/00
[52] U.S. Cl. ....................................... 428/98; 428/99; 428/100; 428/119; 428/120; 428/189; 428/190; 428/221; 428/224
[58] Field of Search .................. 428/98, 99, 100, 119, 428/120, 189, 190, 221, 224

[56] References Cited

U.S. PATENT DOCUMENTS

| | | |
|---|---|---|
| 404,650 | 6/1889 | Noonen . |
| 411,073 | 9/1889 | Tennison . |
| 1,854,936 | 4/1932 | Hutchinson, Jr. . |
| 3,048,183 | 8/1962 | Grundseth . |
| 4,795,208 | 1/1989 | Whiteman ........................... 296/181 |
| 5,121,958 | 6/1992 | Goeden et al. ..................... 296/37.1 |

Primary Examiner—James D. Withers
Assistant Examiner—Kathryne E. Shelbourne
Attorney, Agent, or Firm—Leonard Bloom

[57] ABSTRACT

A safety net attached to the doors at a pumping station to cover the open well when the doors are open. The safety net has a plurality of strips in a first direction and a substantially perpendicular plurality of strips in a second direction. The strips are connected where there are intersections. The edges of the strips have attachment means for connection to the doors, or alternately for connection to the frame about the top of the well. When the doors are opened, the safety net is in place and when the doors are closed, the safety net is suspended in the open well. The safety net may also be connected to a single door for those wells which have only a single door as a cover.

12 Claims, 6 Drawing Sheets

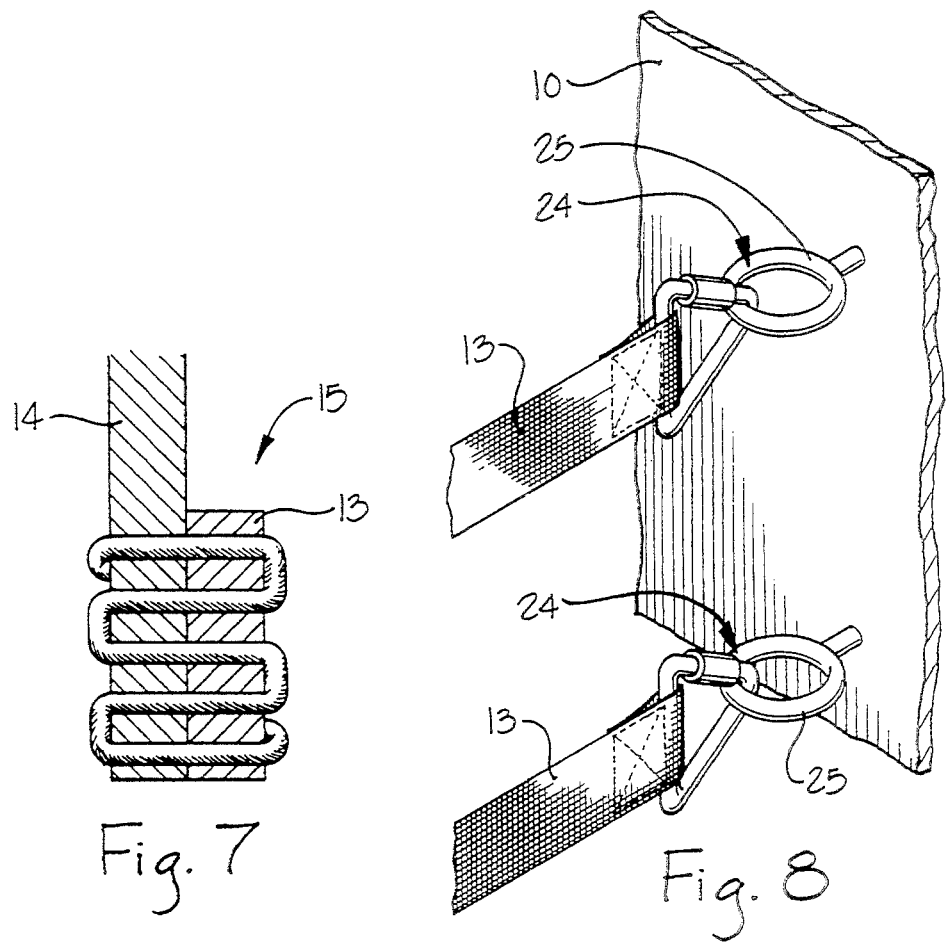
Fig. 7
Fig. 8
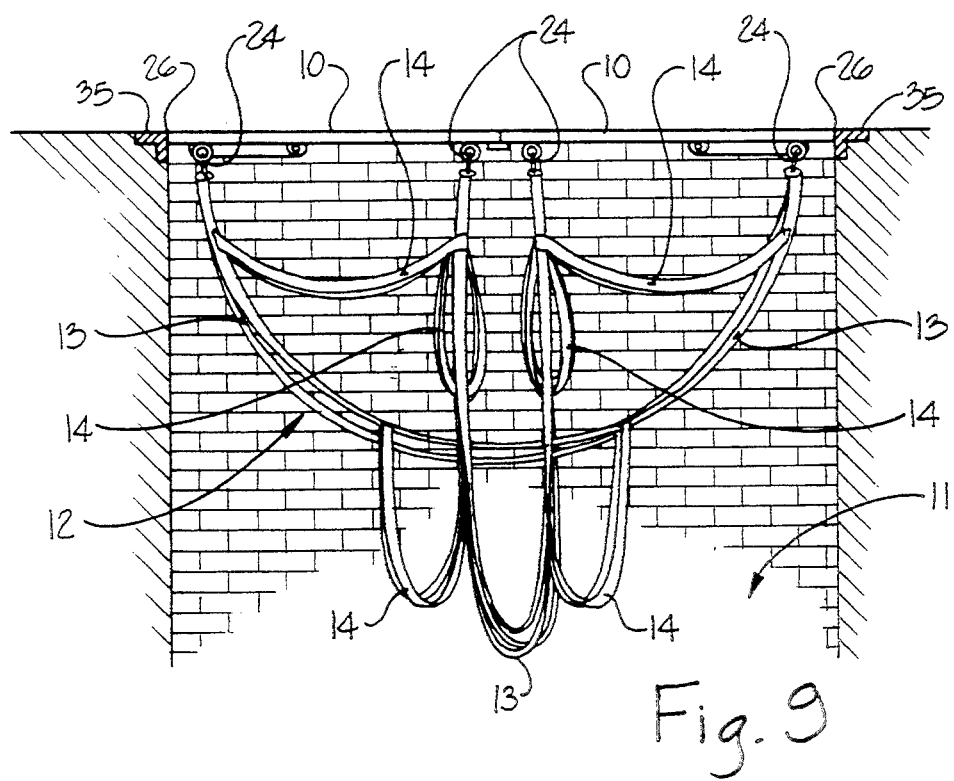
Fig. 9

5,427,836

SAFETY NET

FIELD OF THE INVENTION

The present invention relates to a safety net and more particularly, to a safety net to be used to cover the well of a pumping station to prevent persons from falling in the well.

BACKGROUND OF THE INVENTION

In various regions of the country and particularly in Florida and other states in the southeastern section of the United States, water and sewage are pumped through underground piping. At periodic intervals, there are pumping stations to which access must be available. Generally, at the pumping station, there is a well which may be as deep as forty (40) feet and which is covered by a frame. A single or double door enclosure is attached to the frame to prevent entry into the well. When repairs or maintenance of the pumping stations are required, even if the maintenance is a simple hosing of the inside of the well, the door(s) is opened. Railings and/or portable fences are sometimes set up around the open wells to warn the general public of the potential hazard. However, workers involved in the maintenance of the wells usually do not employ these types of fences. At this time, there is a danger that personnel may fall into the well.

While warnings are given to personnel, and equipment has been considered to prevent falling into the well, a simple inexpensive safety device which is easily installed is needed.

SUMMARY OF THE INVENTION

It is a primary object of the present invention to provide a safety net for use with sewage and water pumping wells covered by doors which is inexpensive, easy to install and effective in preventing persons from falling into the wells.

It is a further object of the present invention to provide a safety net which can be easily attached to a door covering a pumping well for sewage and water.

In accordance with the teachings of the present invention there is disclosed herein a safety net to be attached to a pair of doors covering an open pumping well in the ground, to prevent persons from falling into the well when the doors are opened and the well is uncovered. The safety net includes a first plurality of spaced-apart strips disposed substantially parallel to one another in a plane in a first direction. The safety net further has a second plurality of spaced-apart strips disposed substantially parallel to one another in the plane in a second direction approximately at right angles to the first direction. The first plurality of strips intersect the second plurality of strips and, when the net is laid out flat, form a rectangular net having a first edge, an opposite second edge, a third edge and a fourth edge opposite the third edge. A first plurality of spaced-apart attachment means are disposed on the first edge of the safety net for attachment to one of the doors. A second plurality of spaced-apart attachment means are attached to the second edge of the safety net for attachment to the other of the doors. In this manner, the safety net may be extended over the open well when the doors are opened. The third edge and the fourth edge of the safety net are disposed near the ground. The safety net may be suspended into the well when the doors are closed and cover the well.

In further accordance with the teachings of the present invention, there is disclosed herein a safety net to be attached to a door covering an open pumping well in the ground to prevent persons from falling into the well when the door is open and the well is uncovered. The safety net includes a first plurality of spaced-apart strips disposed substantially parallel to one another in a plane in a first direction. The safety net further has a second plurality of spaced-apart strips disposed substantially parallel to one another in the plane in a second direction approximately at right angles to the first direction. The first plurality of strips intersect the second plurality of strips and form a net having a first edge and an opposite second edge. The well has a top having a frame thereabout. The frame has a first side and an opposite second side. The door is hingably connected to the first side of the frame and when the door is closed, the door contacts the second side of the frame. A first plurality of attachment means are attached to the first edge of the safety net for attachment to the door. A second plurality of attachment means are attached to the second edge of the safety net for attachment to the second side of the frame. In this manner, the safety net may be extended over the open well when the door is opened and the safety net may be suspended into the well when the door is closed and covers the well.

These and other objects of the present invention will become apparent from a reading of the following specification, taken in conjunction with the enclosed drawings.

BRIEF DESCRIPTION OF THE DRAWINGS

FIG. 7 is a cross-sectional view across the lines 7—7 of FIG. 5 showing the strips stitched at the intersection.

FIG. 8 is a perspective view showing the attachment of the edge of the safety net to the door.

FIG. 9 is a cross-sectional view showing the doors closed over the well and the safety net of the present invention suspended from the doors in the well.

DESCRIPTION OF PREFERRED EMBODIMENTS

Figure 1:
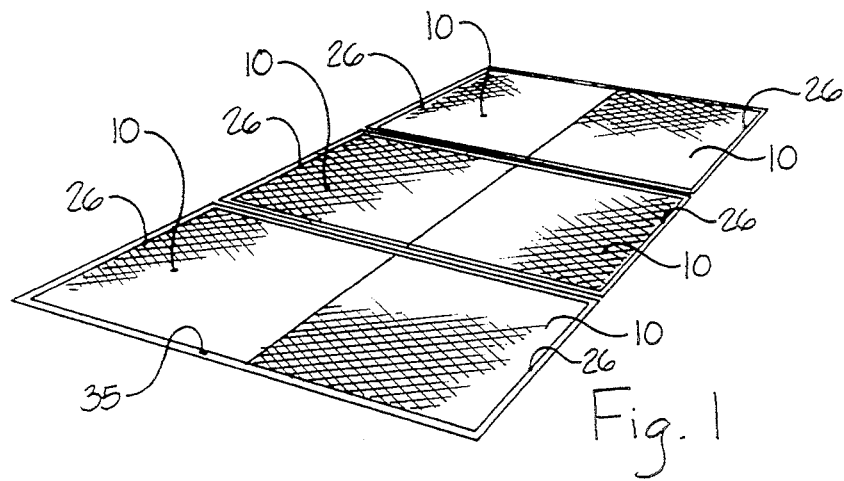
FIG. 1 is a perspective view showing wells covered by closed doors.
Figure 2:
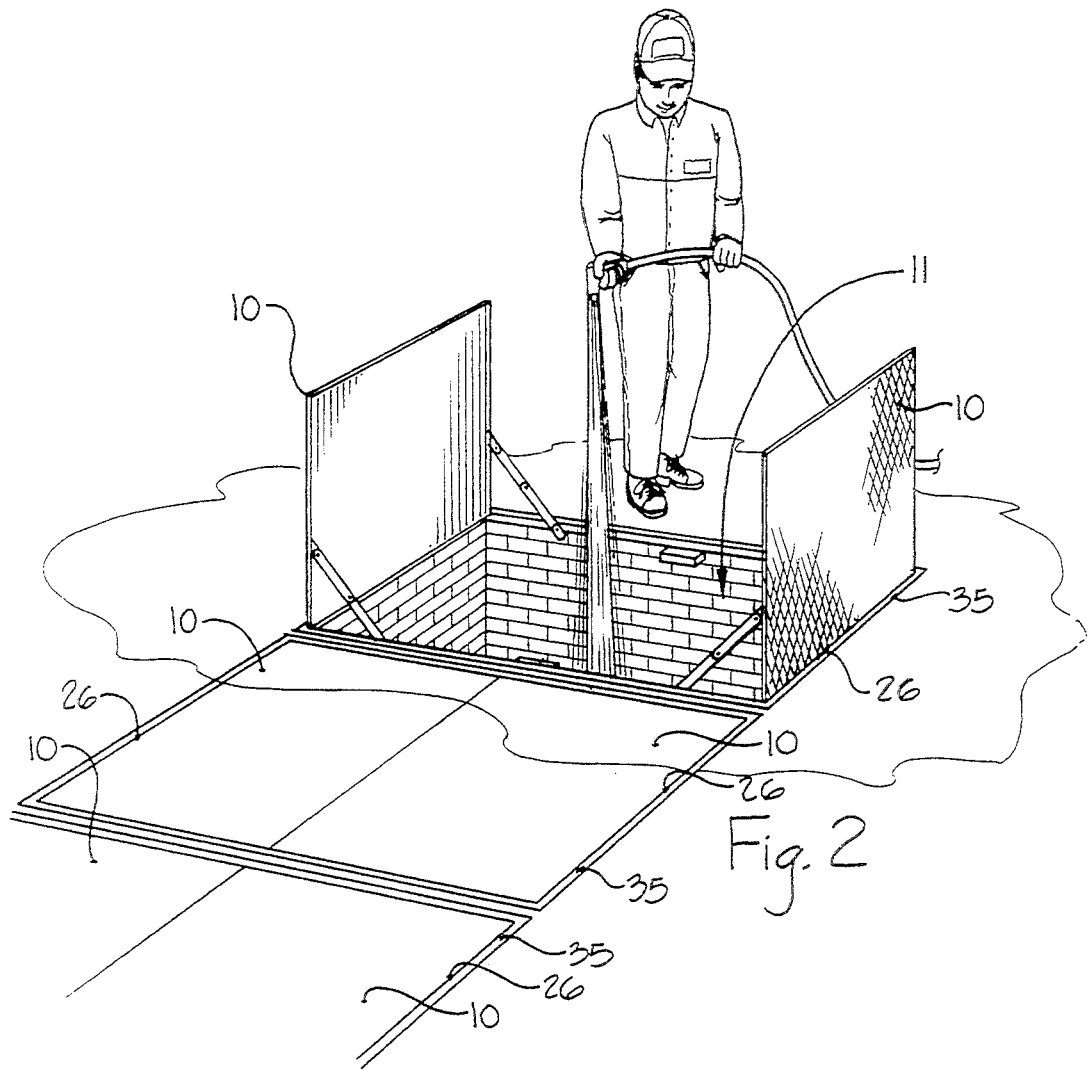
FIG. 2 is a perspective view showing the doors of a well open and a worker near the open doors.
Figure 3:
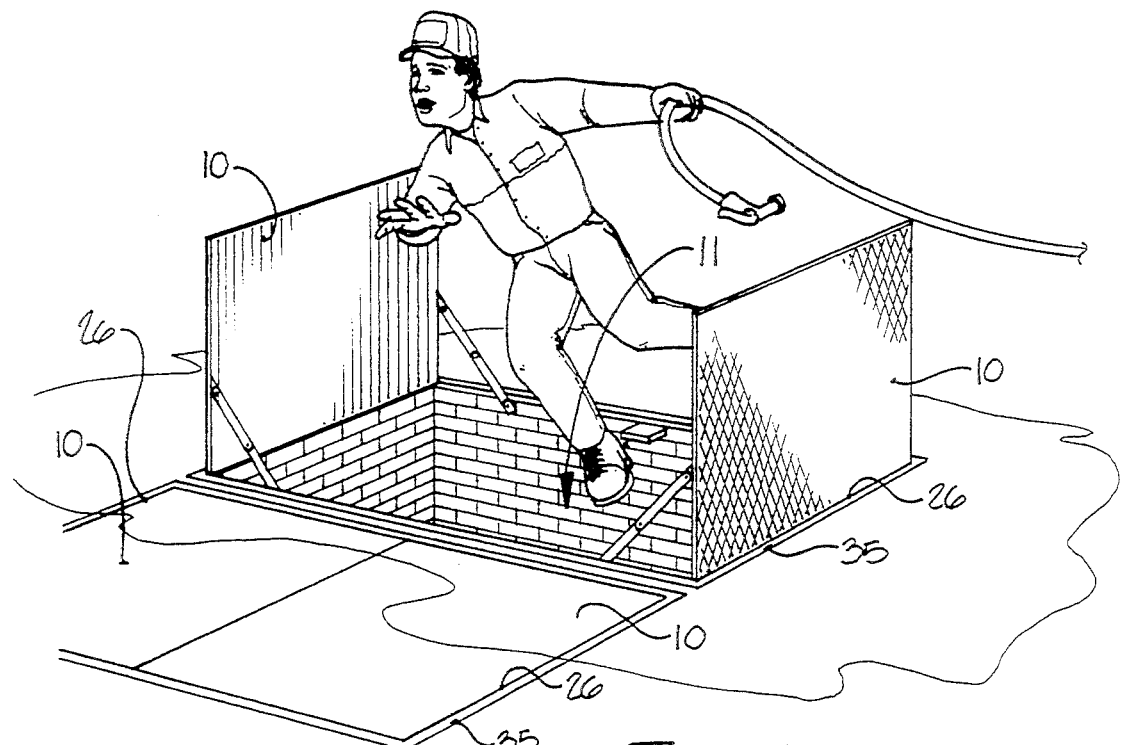
FIG. 3 is a perspective view of FIG. 2 showing the worker falling into the open well.
Figure 4:
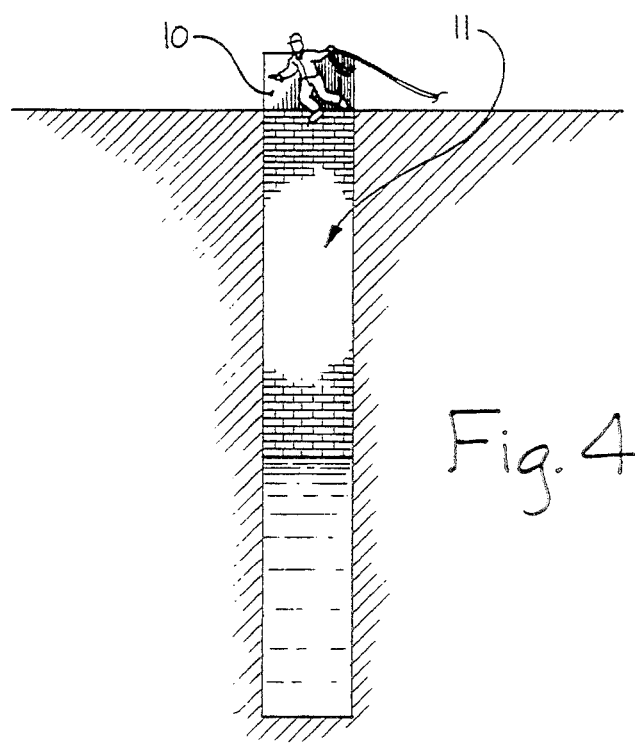
FIG. 4 is a cross-sectional view across the lines 4—4 of FIG. 3 showing the depth of the well and the liquid level within the well.
Figure 5:
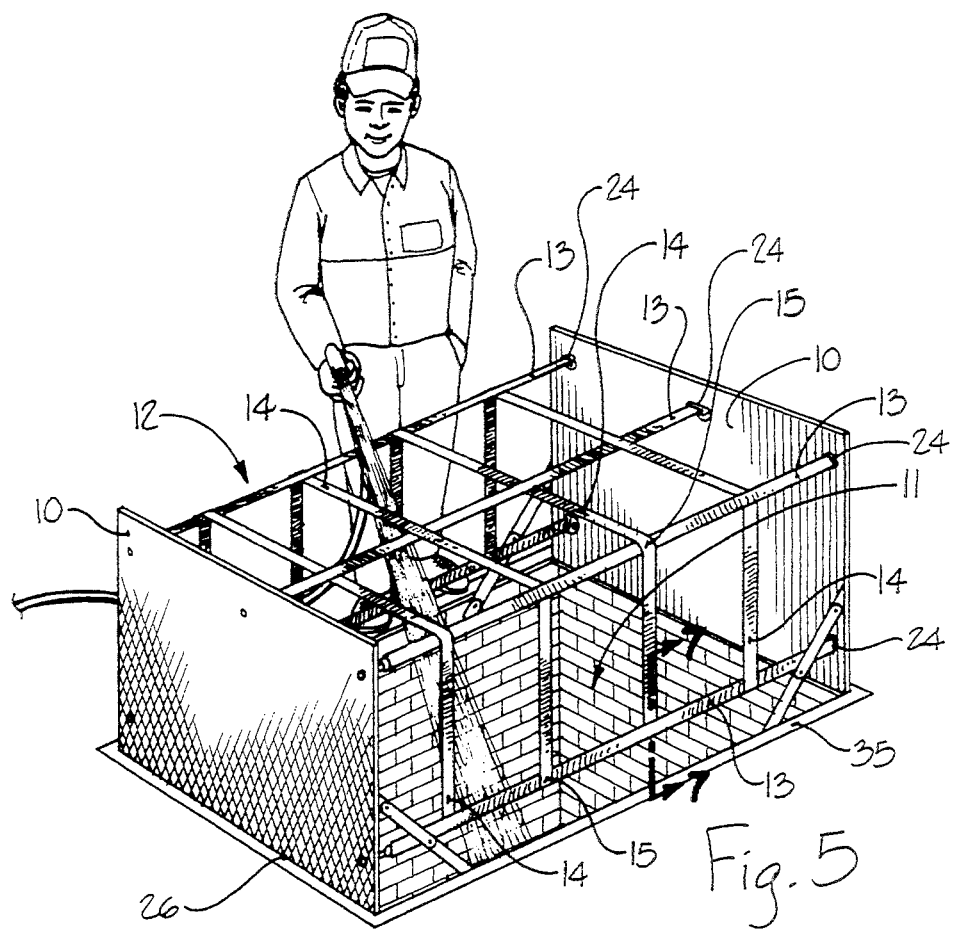
FIG. 5 is a perspective view showing the safety net of the present invention mounted on the doors with the worker near the safety net, the net permitting full utility access to the well.
Figure 6:
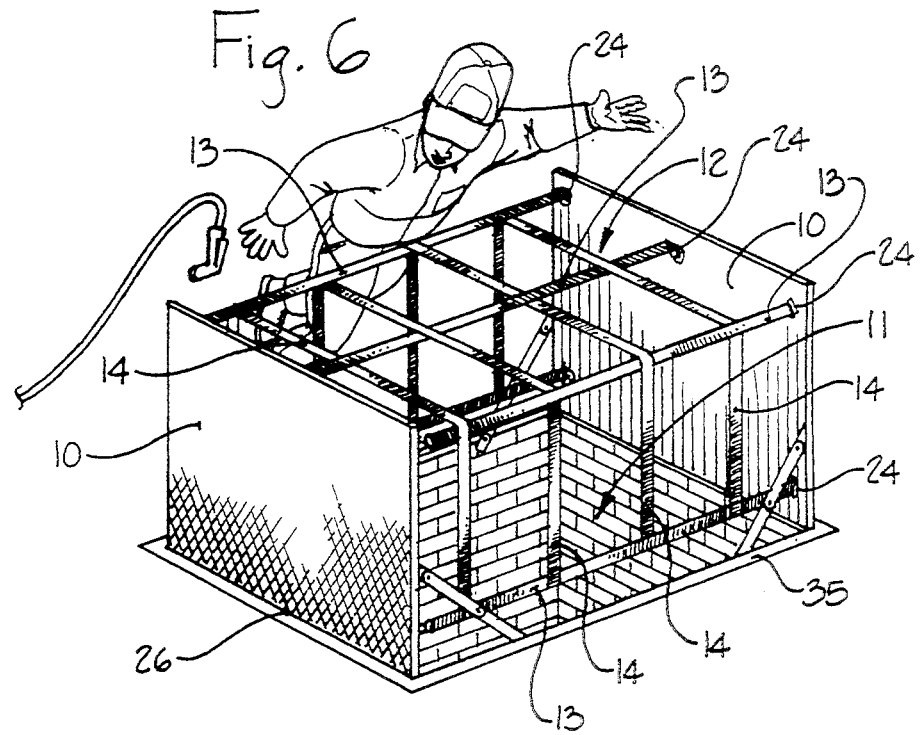
FIG. 6 is a perspective view showing the safety net preventing the worker from falling into the well.

At many pumping stations, there are a plurality of wells which are covered by doors 10 or a door 10' to prevent persons from falling into the wells as shown in FIG. 1. When access to these wells 11 is required by workers servicing or maintaining the wells 11 or equipment within the well, the doors 10 are opened and maintained in the open position by locking means. The worker must take care to avoid falling into the open well 11. If the worker slips, is overcome by fumes or loses his/her balance, the worker may fall into an open well 11 which may be up to forty feet deep in which there is water or sewage up to twenty feet deep (FIGS. 2-4).

The safety net 12 of the present invention is to prevent these types of accidents as shown in FIGS. 5-8. The safety net 12 has a first plurality of spaced-apart strips 13 which are substantially parallel to each other and are in a plane in a first direction. A second plurality of strips which are substantially parallel to each other and are in the same plane as the first plurality of strips 13 but are in a second direction. The first plurality of strips 13 and the second plurality of strips 14 intersect one another and are connected at the intersection 15 to form a substantially rectangular net 12 when the net 12 is laid out flat. The connection at the intersection may be stitching, welding or adhesive. Preferably, the first direction is approximately perpendicular to the second direction such that the respective plurality of strips 13, 14 are at right angles to one another. The individual strips may be of any flexible material with a high tensile strength which is resistant to deterioration in the presence of moisture. Preferably, the strips are formed from a nylon webbing. However, other materials both woven and non-woven may be used.

The safety net 12 has a first edge 20, an opposite second edge 21, a third edge 22 between the first end 20 and the second edge 21 and a fourth edge 23, opposite to the third edge. A plurality of spaced-apart attachment means 24 are disposed on the first edge 20 and on the second edge 21 of the safety net 12. The attachment means 24 are connected to the opposite doors 10 so that the safety net 12 is suspended between the doors 10. The individual means of attachment 24 may be a latch or hook which engages a corresponding eyebolt 25 or opening in the door 10. The plurality of attachment means 24 may extend along the respective first edge 20 and second edge 21 from the third edge 22 to the fourth edge 23 or may extend only a portion of this length. In this manner, the safety net 12 may be attached to the respective doors 10 throughout the three edges of the door 10 which extend above the ground from the hinge 26 of the respective door 10 when the door 10 is opened and supported in a position substantially perpendicular to the ground and to the top of the well 11. Alternately, the safety net 12 may be attached only to the edge of the door 10 which is opposite to the hinge 26 and parallel to the ground when the door is open. In either method of attachment of the safety net 12 to the door 10, it is preferred that the safety net 12 extend from the ground adjacent to the top of the well 11, up to the distal edge of the open door 10, across the length of the door 10 and down to the ground adjacent to the opposite side of the well 11.

Figure 10:
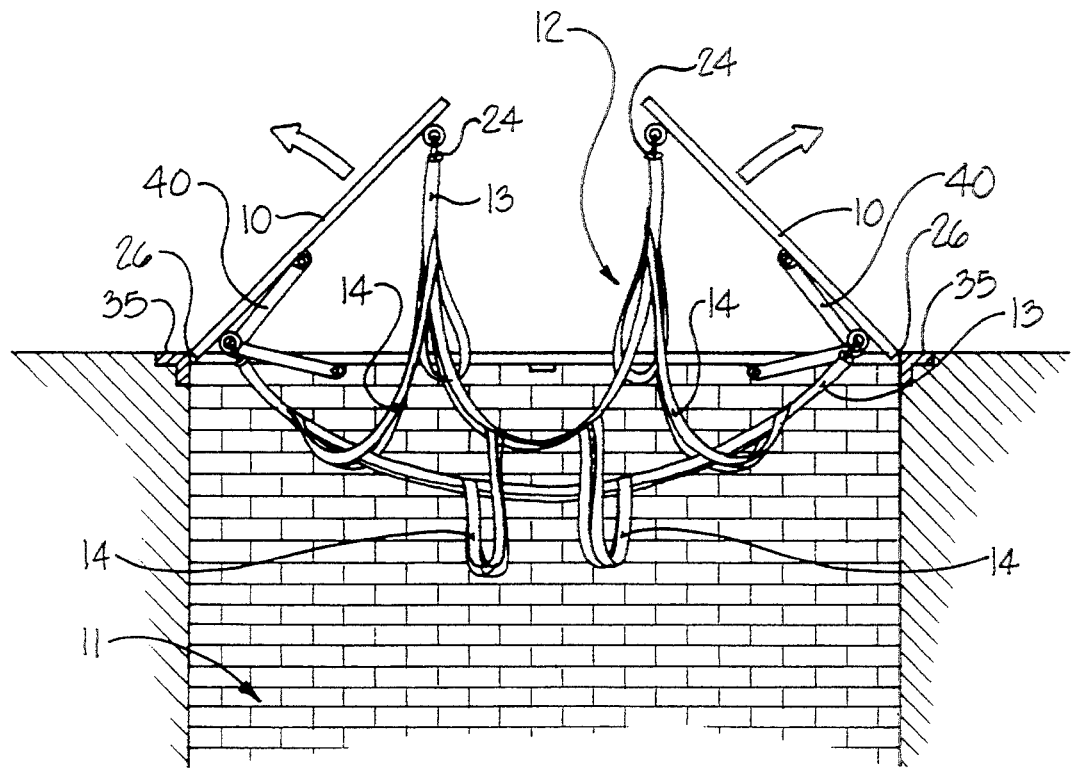
FIG. 10 is a cross-sectional view showing the doors partially open and the safety net of the present invention partially unfolded.
Figure 11:
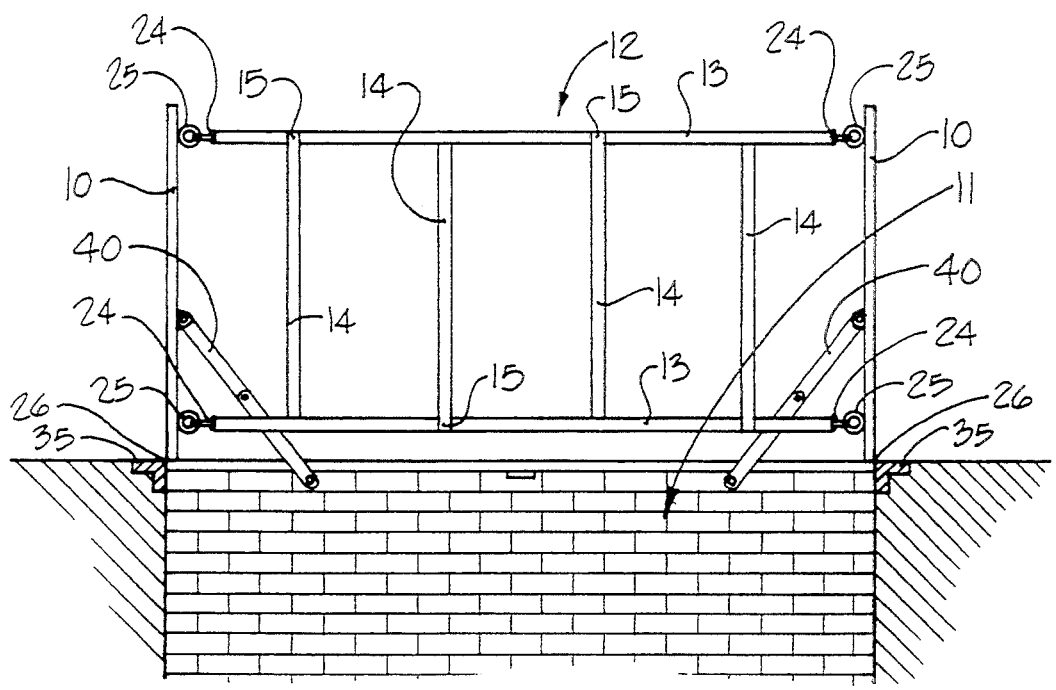
FIG. 11 is a cross-sectional view showing the doors completely opened and the safety net of the present invention extending between the doors.

Referring to FIGS. 9-11, the safety net 12 is suspended from the doors 10 when the doors 10 are closed over the well 11 and the safety net 12 hangs down into the well 11. As the doors 10 are opened, the safety net 12 is raised from within the well 11 until the doors 10 are fully opened and locked in an open position by brace 40. The safety net 12 is fully in place when the doors 10 are fully open and the safety net 12 extends from the distal edge of each door 10 to the top of the well 11.

Figure 13:
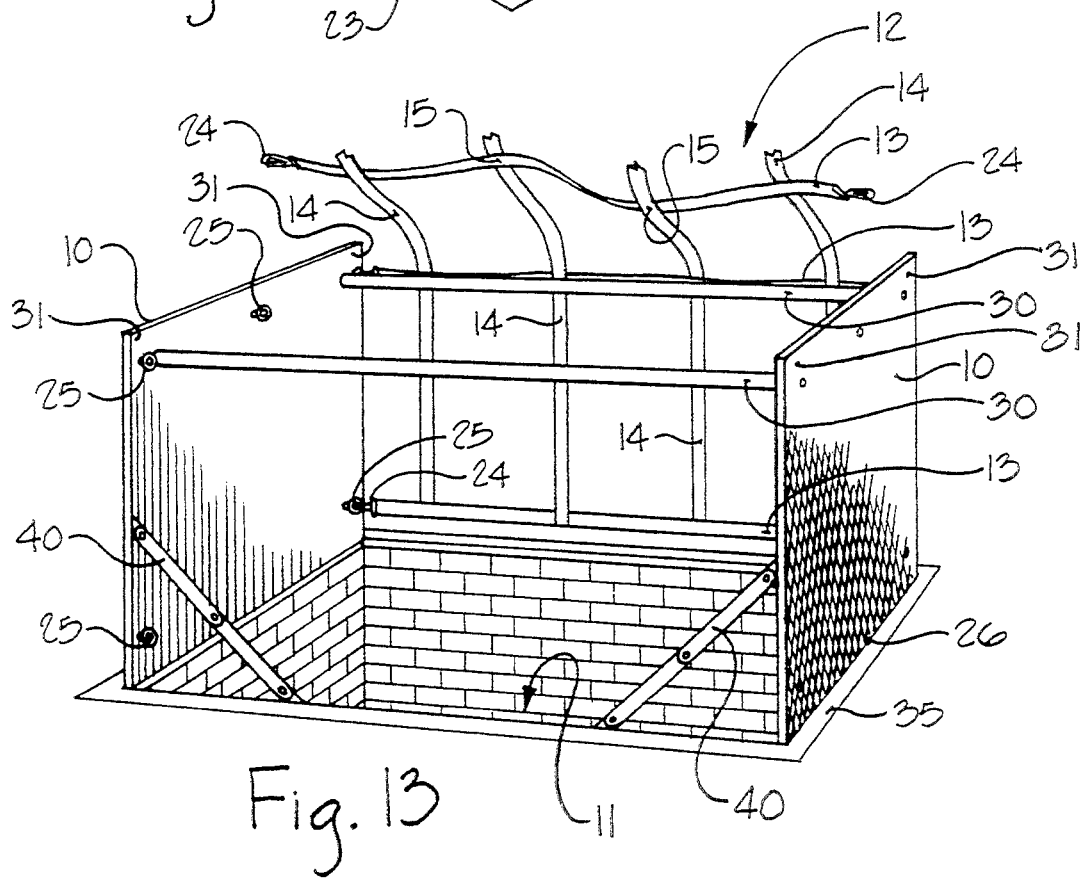
FIG. 13 is a perspective view showing two rigid support rods disposed between the doors with the safety net partially in place and being supported by one of the support rods.

Additional support for the safety net 12 is provided by a pair of rigid bracing rails 30 which may be attached perpendicularly to the corners 31 of the respective doors 10 and extend between the opposite doors above the ground and across the top of the well 11. The rigid rails 30 not only provide support for the safety net 12 but also assist in locking the doors 10 in an open position (FIG. 13). The rigid rails 30 further provide a support for workers. The rigid rails 30 may be wooden, metallic or plastic.

In some pumping stations, the open well 11 is covered by a single door 10'. The safety net 12 may be used in a similar manner as with the double door type of installation except that the top of the well 11 is provided with a frame 35. The door 10' is hingedly mounted on one side of the frame 35 and the opposite side of the frame 35 has a plurality of eyebolts or openings 25 therein to which the attachment means 24 or the safety net 12 may be attached. In this type of installation, the safety net 12 is suspended from the single door 10' into the well 11 and covers the open well 11 when the door 10' is opened, thereby preventing workers from falling into the well 11.

Figure 12:
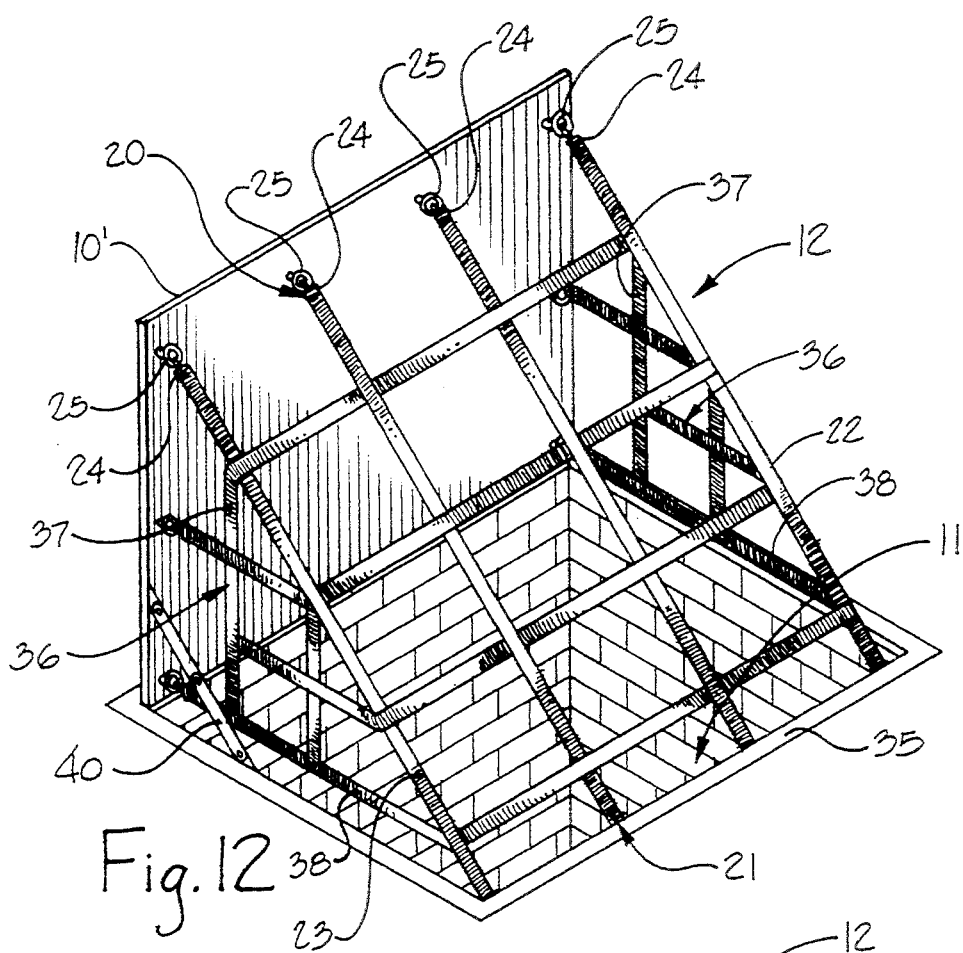
FIG. 12 is a perspective view showing an alternate embodiment where one door covers the well and the safety net of the present invention additionally has triangular portions to cover the well.

Alternately, the safety net 12 may have right angle triangular net portions 36 attached to the respective third edge 22 and fourth edge 23 of the safety net 12. The third edge 22 and the fourth edge 23 are the hypotenuses of the respective triangular net portion 36. The safety net 12 with the triangular portions 36 has a hexagonal shape when the safety net 12 is laid out flat. Each triangular net portion 36 has a first leg 37 which is disposed adjacent to the single door 10' and a second leg 38 which is disposed adjacent to the frame 35 at the top of the well 11. It is preferred that a plurality of spaced-apart attachment means 24 be connected to the first leg 37 of the respective triangular portion 36 to attach the first leg 37 to corresponding eyebolts 25 or openings in the door 10'. If desired, attachment means 24 may also be connected to the second leg 38 of the respective triangular portion to attach the second leg 38 to corresponding eyebolts 25 or openings in the frame 35 around the top of the well 11. The hexagonal safety net 12 thereby fully covers the opening to the well 11 when the single door 10' is open with the first edge 20 connected to the distal edge of the door 10', the second edge 21 connected to the frame 35 opposite the door 10' each first leg 37 connected to the door 10' from the hinge 26 to the distal edge and each second leg 38 disposed adjacent to (or connected to) the frame 35 (FIG. 12). When so connected, the safety net 12 angles downwardly from the distal edge of the open door 10' to the frame 35 with the triangular net portions 36 enclosing the well 11. When the door 10' is closed, the safety net 12 is suspended within the well 11.

The safety net 12 of the present invention provides a cost effective, easily installed means of preventing workers from falling into the well 11 of a pumping station. The safety net 12 is stored within the well 11 when the door/doors are closed and is immediately in the protecting position when the door/doors are opened. The grid-like arrangement of the strips provides openings large enough for workers to insert hoses, tools, brushes and similar equipment through the openings to maintain the wells while still receiving the protection of the safety net 12.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A safety net attached to and in combination with, a pair of doors covering an open pumping well in the ground, to protect persons from falling into the well when the doors are opened and the well is uncovered, the doors each having a bottom edge, an opposite top edge and a respective pair of opposite sides between the bottom edge and the top edge, the respective top edges of the doors being adjacent to one another when the doors are closed over the well, the doors being hinged at the bottom edges thereof, wherein the doors may be opened to confront one another and uncover the well, the safety net having a first plurality of spaced-apart strips disposed substantially parallel to one another in a plane in a first direction, a second plurality of spaced-apart strips disposed substantially parallel to one another in the plane in a second direction wherein the first plurality of strips intersect the second plurality of strips and, when the net is laid out flat form a flexible rectangular net having a first edge, an opposite second edge, a third edge and a fourth edge opposite the third edge, a first plurality of spaced-apart attachment means being disposed on the first edge of the safety net and attached to one of the doors along both the sides, and across the top edge thereof, and a second plurality of spaced-apart attachment means being attached to the second edge of the safety net and attached to the other of the doors along both the sides and across the top edge thereof, the safety net being immediately extended as an inverted U-shaped enclosure over the open well when the doors are opened, means for maintaining the doors open to expose the open well, the third edge and the fourth edge of the safety net being disposed near the ground providing protection between the sides of the open doors, and the safety net being suspended into the well from the sides and the top edges of the respective doors when the doors are closed and cover the well.

2. The safety net of claim 1, wherein the first plurality of strips are connected to the second plurality of strips where the strips intersect one another.

3. The safety net of claim 1, wherein the strips are webbing.

4. The safety net of claim 1, further comprising each door having a plurality of spaced-apart eyebolts connected thereto along the sides and between the sides of each door, wherein the plurality of attachment means on the safety net are latches to engage the respective eyebolts to attach the safety net to the doors.

5. The safety net of claim 1 further comprising a pair of rigid rails, the rigid rails being disposed substantially perpendicular to the doors to maintain the doors in an open position, the rigid rails supporting the strips of the safety net.

6. The safety net of claim 1, wherein the intersection of the first plurality of strips and the second plurality of strips forms a plurality of openings between the strips, said openings being large enough to receive a hose and work tools therein and small enough to prevent a person from fitting therein.

7. A safety net to protect persons from falling into an open well when the well is uncovered, the safety net, in combination with a door to cover the well, comprising, a first plurality of spaced-apart strips disposed substantially parallel to one another in a plane in a first direction, a second plurality of spaced-apart strips disposed substantially parallel to one another in the plane in a second direction wherein the first plurality of strips intersect the second plurality of strips and form a flexible net having a first edge and an opposite second edge, the well having a top having a frame thereabout, the frame having a first side and an opposite second side, the door having a first hinged side, a second side opposite the hinged side and two opposite sides therebetween, the first side of the door being hingably connected to the first side of the frame and when the door is closed, the second side of the door contacting the second side of the frame, a first plurality of attachment means being attached to the first edge of the safety net and attached to the second side of the door, a second plurality of attachment means being attached to the second edge of the safety net and attached to the second side of the frame, means for maintaining the door open to expose the open well, the safety net being extended over, and protecting persons from falling into, the open well when the door is opened and the safety net being suspended into the well when the door is closed and covers the well.

8. The safety net of claim 7, wherein the first plurality of strips are connected to the second plurality of strips where the strips intersect one another.

9. The safety net of claim 7, wherein the strips are webbing.

10. The safety net of claim 7, further comprising the door having a plurality of spaced-apart eyebolts connected thereto and the second side of the frame having a plurality of spaced-apart openings formed therein such that the first and second attachment means on the safety net may be removably attached to the door and first side of the frame respectively.

11. The safety net of claim 7, further comprising the safety net having a third edge and an opposite fourth edge, the third and fourth edges extending between the first and second edges and being substantially perpendicular thereto, a substantially right angle triangular net portion being attached to the third and fourth edges respectively wherein said edges are the hypotenuses of the respective triangular portions, each triangular portion having a respective first leg disposed adjacent to the respective opposite sides of the door and attached thereto and each respective triangular portion having a respective second leg disposed adjacent to the frame of the well and attached thereto such that the safety net effectively covers the well when the door is opened.

12. The safety net of claim 7, wherein the intersection of the first plurality of strips and the second plurality of strips forms a plurality of openings between the strips, said openings being large enough to receive a hose and work tools therein and small enough to prevent a person from fitting therein.

* * * * *